United States Patent
Lee et al.

(10) Patent No.: US 6,850,509 B2
(45) Date of Patent: Feb. 1, 2005

(54) SCHEDULING APPARATUS AND METHOD FOR PACKET DATA SERVICE IN A WIRELESS COMMUNICATION SYSTEM

(75) Inventors: Sung-Won Lee, Songnam-shi (KR); Soon-Young Yoon, Seoul (KR); Seung-Joo Maeng, Songnam-shi (KR); Woo-June Kim, Seoul (KR); Hong-Seong Chang, Songnam-shi (KR); Hoon Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 353 days.

(21) Appl. No.: 09/773,813

(22) Filed: Feb. 1, 2001

(65) Prior Publication Data

US 2001/0021180 A1 Sep. 13, 2001

(30) Foreign Application Priority Data

Feb. 1, 2000 (KR) .......................................... 2000-4993

(51) Int. Cl.[7] ................................................ H04J 3/00
(52) U.S. Cl. ....................................................... 370/336
(58) Field of Search ......................... 370/458, 330–338, 370/392, 342, 326–329, 441, 431, 252, 233–235, 236, 480; 455/455, 522, 13.2, 13.4, 17, 69, 422, 452, 450, 553–558

(56) References Cited

U.S. PATENT DOCUMENTS

| | | | | |
|---|---|---|---|---|
| 5,790,551 A | * | 8/1998 | Chan ........................... | 370/458 |
| 5,862,142 A | * | 1/1999 | Takiyasu et al. ............ | 370/480 |
| 5,923,650 A | * | 7/1999 | Chen et al. .................. | 370/331 |
| 5,930,706 A | * | 7/1999 | Raith .......................... | 455/422 |
| 5,940,743 A | * | 8/1999 | Sunay et al. ................ | 455/69 |
| 5,956,329 A |   | 9/1999 | Pernice et al. | |
| 6,005,852 A | * | 12/1999 | Kokko et al. ............... | 370/329 |
| 6,069,883 A | * | 5/2000 | Ejzak et al. ................. | 370/335 |
| 6,157,614 A | * | 12/2000 | Pasternak et al. ........... | 370/236 |
| 6,381,228 B1 | * | 4/2002 | Prieto, Jr. et al. ........... | 370/323 |
| 6,385,456 B2 | * | 5/2002 | Menzel ........................ | 455/452 |
| 6,393,008 B1 | * | 5/2002 | Cheng et al. ................ | 370/338 |
| 6,469,991 B1 | * | 10/2002 | Chuah ......................... | 370/329 |
| 6,470,001 B1 | * | 10/2002 | Kim et al. ................... | 370/342 |
| 6,501,745 B1 | * | 12/2002 | Turina et al. ................ | 370/337 |

FOREIGN PATENT DOCUMENTS

| | | |
|---|---|---|
| JP | 09-055693 | 2/1997 |
| RU | 2128406 | 3/1999 |
| WO | WO95/35002 | 12/1995 |
| WO | WO 98/35514 | 8/1998 |

OTHER PUBLICATIONS

Japanese Office Action dated Feb. 24, 2004 issued in a counterpart application, namely, Appln. No. 2001–557199.

* cited by examiner

Primary Examiner—Kwang Bin Yao
Assistant Examiner—Prenell Jones
(74) Attorney, Agent, or Firm—Dilworth & Barrese, LLP.

(57) ABSTRACT

Disclosed is a method for assigning packet data to be transmitted to a radio packet data channel of a base station system in response to a packet traffic transmission request for a plurality of mobile stations in a mobile communication system. The method comprises collecting the packet traffic transmission requests of the radio packet data channel for the mobile stations; selecting at least one of the mobile stations from the collected packet traffic transmission requests; transmitting to the selected mobile station a channel assignment message including information about a data rate, data transmission durations of the radio packet data channel and start points of the data transmission durations for the selected mobile station; and transmitting the packet data to the selected mobile station at the start time of the data transmission durations at the data rate.

13 Claims, 9 Drawing Sheets

SCHEDULING APPARATUS AND METHOD FOR PACKET DATA SERVICE IN A WIRELESS COMMUNICATION SYSTEM

PRIORITY

This application claims priority to an application entitled "Scheduling Apparatus and Method for Packet Data Service in a Wireless Communication System" filed in the Korean Industrial Property Office on Feb. 1, 2000 and assigned Serial No. 2000-4993, the contents of which are hereby incorporated by reference.

BACKGROUND OF THE INVENTION

1. Field of the Invention

The present invention relates generally to a traffic channel assignment apparatus and method for a wireless communication system, and in particular, to an apparatus and method for assigning a packet traffic channel.

2. Description of the Related Art

FIG. 1 shows the structure of a conventional wireless communication network, and FIG. 2 shows a method for assigning a radio traffic channel in the conventional wireless communication network of FIG. 1.

Referring to FIGS. 1 and 2, a description will be made of a method for assigning a radio channel to a mobile station in the conventional wireless communication network.

To assign a radio packet data channel to a mobile terminal, base station controllers (BSCs) 111-11M inquire of associated base transceiver systems (BTSs) 101-10N about whether it is possible to assign a radio packet data channel to the mobile station. Upon receipt of the radio packet data channel assignment request in step 211, the BTS determines in step 213 whether there is an available radio packet data channel (for example, a supplemental channel (SCH) in a CDMA-2000 system). In this case, the BTS also determines whether there is available power or whether there is an available code in the CDMA system. If it is possible to assign the radio packet data channel, the BTS transmits a channel assignment message to the BSC, reverses resources for the radio packet data channel to be assigned to the mobile terminal so that other mobile terminals cannot use it, and then, exchanges radio packet data channel assignment-related signal messages with the mobile station, by performing steps 215–219. Otherwise, when there is no available radio packet data channel, the BTS transmits a reject message to the BSC in step 221, and the BSC then attempts to request assignment of the radio packet data channel after a lapse of predetermined time.

However, this radio traffic channel assignment method has the following disadvantages. In the following description, a "radio traffic channel" or a "radio packet traffic channel" is assumed to be identical to a supplemental channel (SCH) for transmitting radio packet data.

First, describing channel assignment for the case where there is an available radio packet data channel, an assigned radio packet data channel cannot be used by other users beginning at a predetermined time before the base station system (BSS) exchanges data with the mobile station. That is, the radio packet data channel is previously assigned to the corresponding user beginning at the time when the BTS assigns the channel, so that the assigned channel (or traffic channel) is wasted until before the traffics (or data) are actually exchanged. This considerably degrades performance of the radio packet data channel (or traffic channel).

For example, if it is assumed that it takes 300 ms to assign the radio packet data channel and the traffics are actually changed for about 300 ms between the mobile station and the base station system, the total time for which the radio packet data channel is assigned to the corresponding mobile station will become 600 ms. However, since the time for which the traffics are actually exchanged is 300 ms, the remaining 300 ms cannot be used by the other mobile stations, thus causing a waste of the assigned channel. As a result, the utilization efficiency of the radio traffic channel is decreased.

Second, since the radio packet data channel is assigned to a specific user on a circuit basis, unless the user releases the channel, other users cannot use the corresponding resources, even though the user does not transmit and receive packet data over the radio packet data channel. Therefore, there arises the low-channel efficiency problem and the unfairness problem among the users. In addition, the user must pay the call fee for the total time for which the radio packet data channel was assigned to him, even though he did not transmit and receive packet data over the radio packet data channel. Hence, the user pays much higher call fees as compared with an amount of the packet data which was actually exchanged over the radio packet data channel.

SUMMARY OF THE INVENTION

It is, therefore, an object of the present invention to provide a scheduling apparatus and method for reserving assignment of a radio packet traffic channel for servicing packet data in a wireless communication system.

It is another object of the present invention to provide an apparatus and method for assigning a radio packet traffic channel in a wireless communication system.

It is further another object of the present invention to provide an apparatus and method for assigning channels to a plurality of users by introducing a packet switching technique, and immediately releasing the assigned channels after the users complete the use of the assigned channels.

It is yet another object of the present invention to provide a leg selection apparatus and method for assigning a packet data channel when there exists a plurality of legs in a base station system for a wireless communication system.

It is still another object of the present invention to provide an apparatus and method for acquiring radio information for scheduling by collecting radio information for assignment of a packet data channel in a base station system for a wireless communication system.

It is still another object of the present invention to provide an apparatus and method for solving a frame offset collision problem of a packet data channel in a base station system for a wireless communication system.

It is still another object of the present invention to provide an apparatus and method for solving a mis-recognition problem of a packet data channel assigned to a mobile station in a base station system for a wireless communication system.

To achieve the above and other objects, there is provided a method for assigning packet data to be transmitted to a radio packet data channel of a base station system in response to a packet traffic transmission request for a plurality of mobile stations in a mobile communication system. The method comprises collecting the packet traffic transmission requests of the radio packet data channel for the mobile stations; selecting at least one of the mobile stations from the collected the packet traffic transmission requests;

transmitting to the selected mobile station a channel assignment message including information about a data rate, data transmission duration of the radio packet data channel and starting points of the data transmission duration for the selected mobile station; and transmitting the packet data to the selected mobile station at the start points of the data transmission duration at the data rate.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
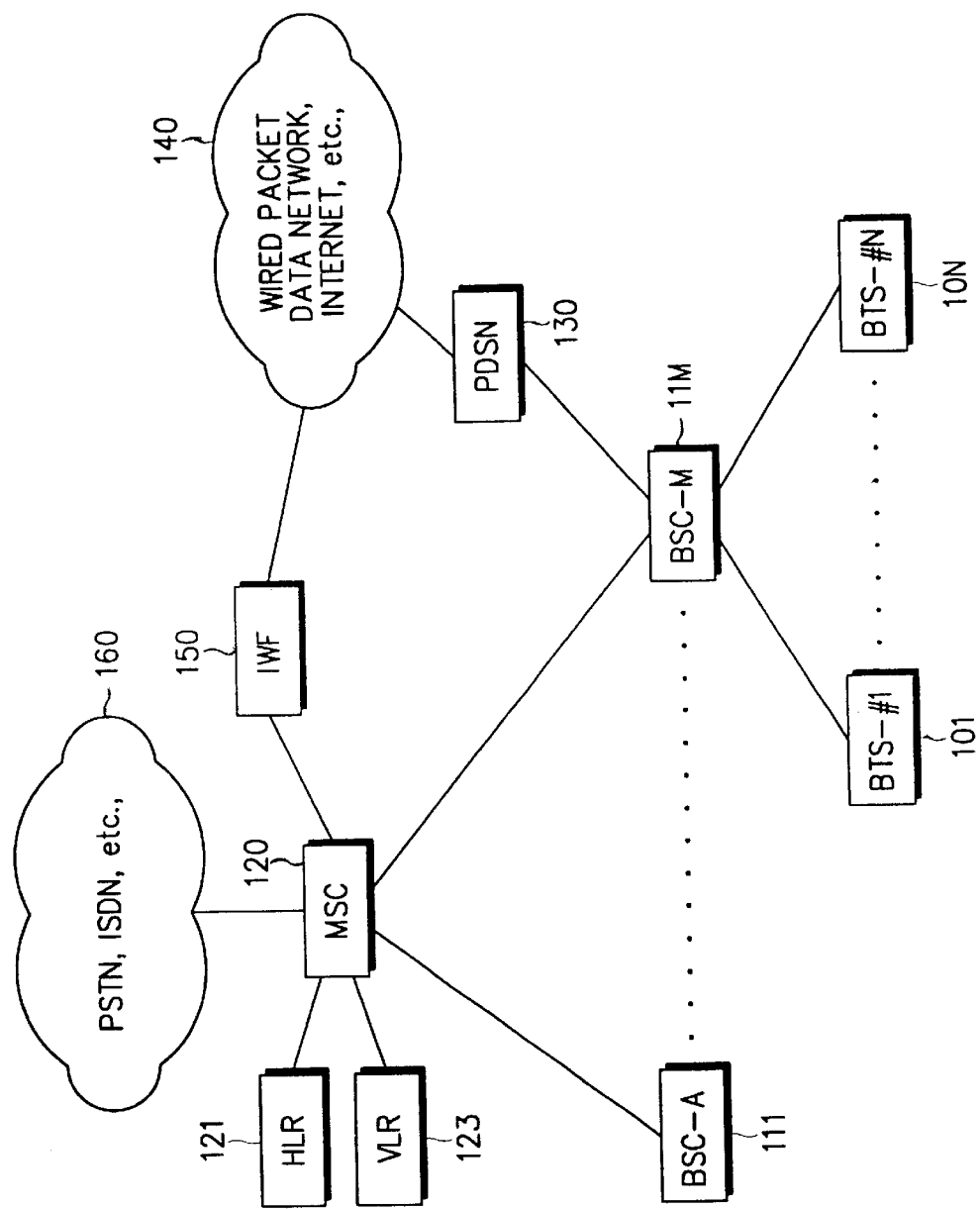
FIG. 1 is a diagram illustrating a structure of a conventional wireless communication network.
Figure 2:
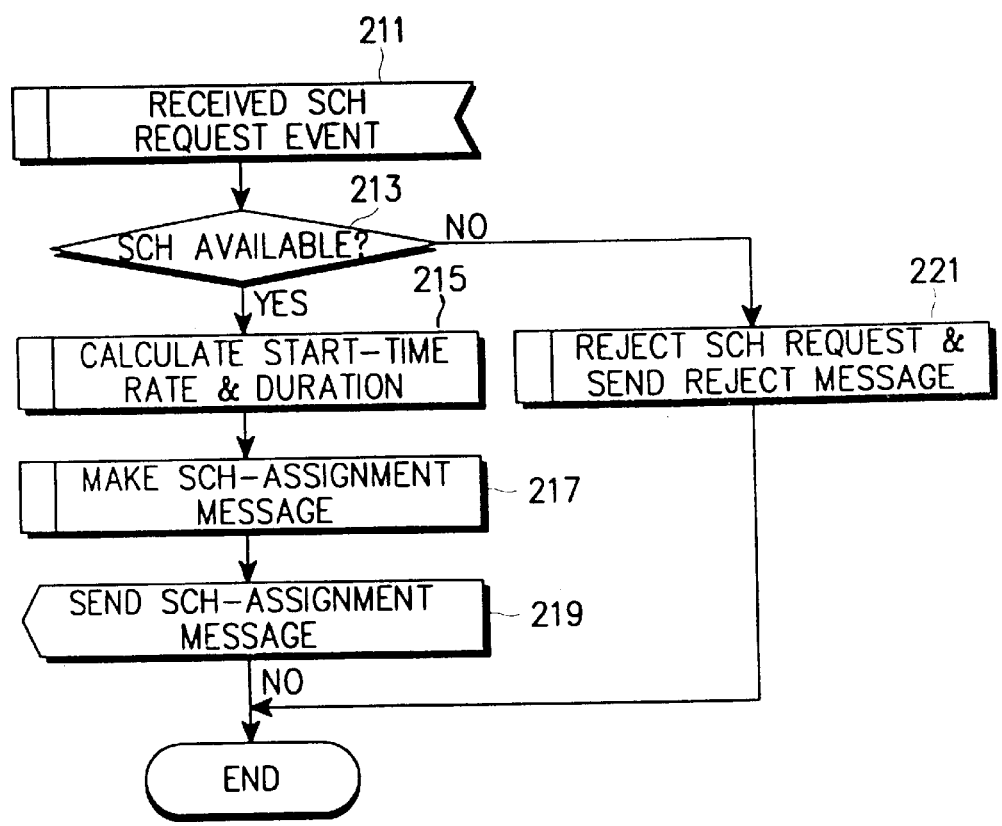
FIG. 2 is a flow chart illustrating a method for assigning a radio traffic channel in the conventional wireless communication system.

A preferred embodiment of the present invention will be described herein below with reference to the accompanying drawings. In the following description, well-known functions or constructions are not described in detail since they would obscure the invention in unnecessary detail.

In the following description, it will be assumed that in order to assign a packet data channel and a packet traffic channel, a supplemental channel (SCH) is used for a radio packet data channel, a scheduling interval $R_{SCHEDULING\_INTERVAL}$ is set to 260 ms, a data transmission duration $R_{DURATION}$ is set to 80 ms, and 3 of 5 candidate mobile stations are selected when scheduling a radio packet data channel. However, it would be obvious to those skilled in the art that various changes may be made without departing from the spirit and scope of the invention.

Prior to a detailed description of a preferred embodiment of the present invention, a method for scheduling and assigning a packet data channel in a wireless communication system according to the present invention will be described in brief.

An embodiment of the present invention introduces a reservation (or scheduling) technique for assignment of a radio packet data channel. Therefore, even though a radio packet data channel is assigned to a specific mobile station, other users can use the radio packet data channel before the specific mobile station can actually transmit and receive a traffic over the assigned radio packet data channel. Accordingly, the radio packet data channel is constantly operated without a pause on a pipe lining basis by multiple users. In this manner, the wireless communication system can maximize efficiency of the radio channels for servicing the packet data by assigning the packet data channels by the scheduling technique.

Further, in the embodiment of the present invention, the wireless communication system introduces a packet switching concept so that the mobile stations are rapidly assigned radio packet data channels and then, immediately release the assigned radio packet data channels after using the channels for the assigned time. Therefore, the wireless communication system can prevent the radio packet data channels having the limited high-class resources from being monopolized by minor users.

In addition, the embodiment of the present invention proposes a leg selection method for assigning a radio packet data channel when there exists a plurality of legs in a base station system, to thereby provide good channel assignment capability even during a handoff. Further, the embodiment of the present invention proposes a method for enabling the base station system to collect radio information for assignment of the radio packet data channel so as to collect information for scheduling the packet data channel. Moreover, the embodiment of the present invention proposes a method for enabling the base station system to perform efficient power control on the radio packet data channel, in order to enable efficient power control in the CDMA-2000 international standard environment. Furthermore, the embodiment of the present invention provides a method for enabling the base station system to solve a frame offset collision problem of the radio packet data channel, so as to solve the problems which may occur when a frame offset of the CDMA (Code Division Multiple Access) system operates with a scheduling algorithm. In addition, the embodiment of the present invention prevents a malfunction problem of the mobile station by proposing a method for enabling the base station system to solve a mis-recognition problem of a radio packet data channel assignment message, which may occur in the mobile station.

Now, a detailed description will be made of the foregoing embodiment of the present invention.

The method for assigning and scheduling a radio traffic channel, proposed in the invention, is based on the CDMA system, and can be applied to every high-speed transmission environment. Therefore, the embodiment of the present invention can be applied to a CDMA-2000 system, a UMTS system and a wideband CDMA system, which are all based on the CDMA system and can provide a high-speed radio data transmission service.

Herein, the description of the present invention will be made with reference to a wireless communication network based on the CDMA-2000 system.

Figure 3:
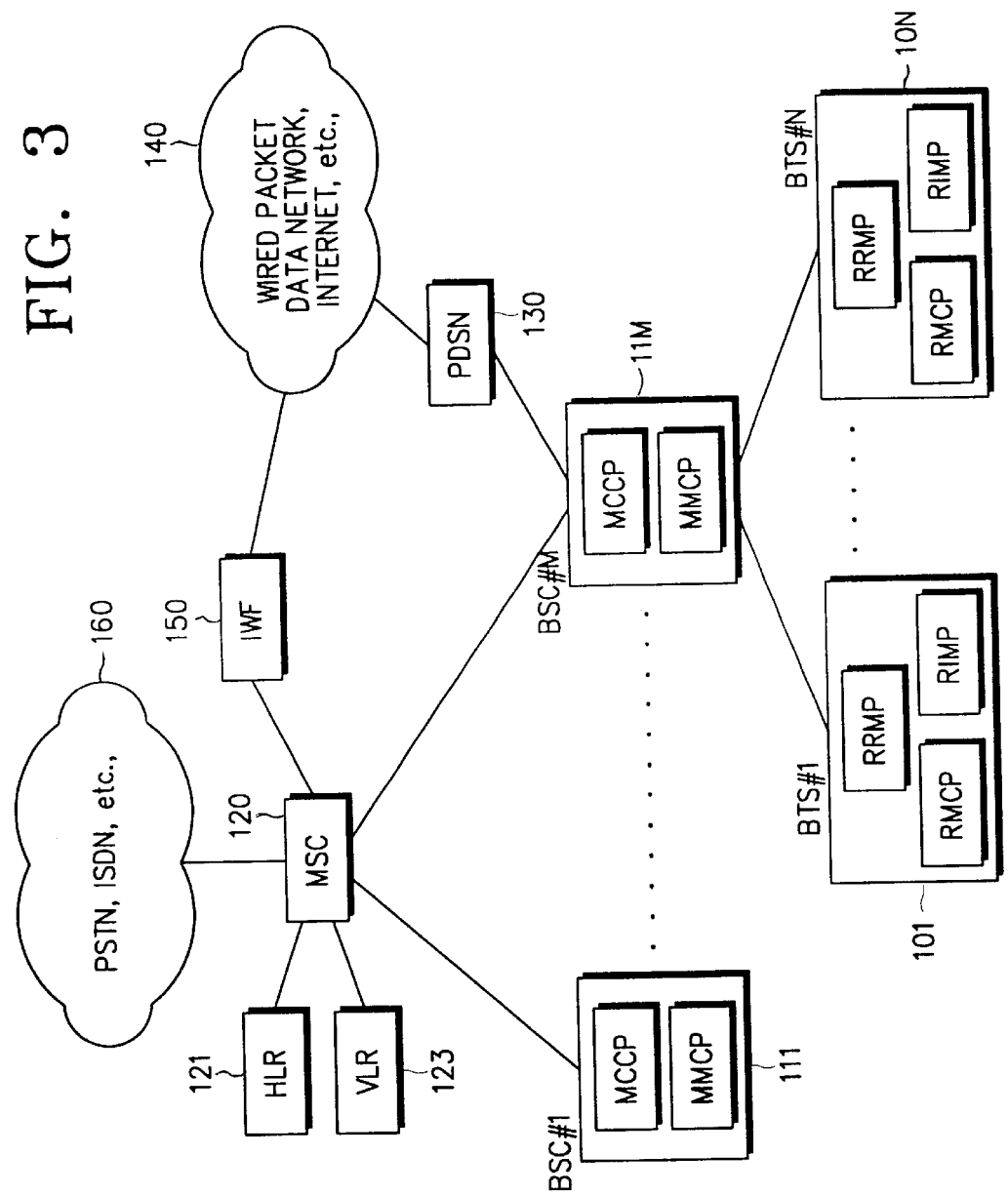
FIG. 3 is a diagram illustrating a structure of a wireless communication network according to an embodiment of the present invention.

The method for assigning and scheduling the radio traffic channel, proposed in the embodiment of the present invention, is performed in a wireless communication network shown in FIG. 3. As illustrated in FIG. 3, the wireless communication network, to which the present invention is applicable, includes the following elements.

With respect to terminology, a mobile station (MS) is communication equipment carried by a mobile subscriber.

The mobile station is a CDMA-based device, which can support a voice service, a data service, and a combined service of voice and data. A base station system (BSS) is equipment for performing direct communication with the mobile station in the wireless communication network. The base station system performs management of the radio resources, mobility control of the mobile station, and interfacing with a wired communication network.

In particular, the base station system is comprised of base transceiver systems (BTSs) 101-10N and base station controllers (BSCs) 111-11M. The BTSs 101-10N chiefly manage the radio resources through direct interfacing with the mobile station, and the BSCs 111-11M each control their associated BTSs 101-10N. Here, the BSC and the BTS can also be united into one device. However, in most cases, they are separated such that a plurality of BTSs are connected to one BSC. The embodiment of the present invention is applied to the latter case, which has a tree structure or a star or ring structure in which a plurality of BTSs 101-10N are connected to one BSC as shown in FIG. 3.

A mobile switching system (MSC) 120 supports a gateway function for a wired voice switching network such as a public switched telephone network (PSTN) for the voice service, and supports interworking with a packet data network through an interworking function (IWF) device 150 for the circuit data service. In the following description, the wired voice switching network will be assumed to be a PSTN. In addition, the MSC 120 supports mobility management of the mobile station through interfacing with a home location register (HLR) 121 and a visitor location register (VLR) 123.

The HLR 121 is a device for storing a home location of the mobile station. The HLR 121 stores location-related information of the subscribers and principal subscription information such as QoS (Quality of Service) information.

The VLR 123 performs location management at the present mobile station's area in order to trace the location of the mobile station when the present location of the mobile station is not the home location.

A packet data serving node (PDSN) 130 interlinks a wired packet data service network 140 with the BSCs 111-11M. The data communicated through the PDSN 130 is the packet data, and is linked to the wired packet data service network 140.

The embodiment of the present invention is applied to the mobile station and the base station system shown as elements in the wireless communication network of FIG. 3. In the following description, the term "base station system (BSS)" will be defined as a device comprised of the base station controller (BSC) and the base transceiver system (BTS). In addition, it will be assumed herein that the wireless communication network is based on the CDMA-2000 system. Further, although the wireless communication network has been described with reference to the existing mobile communication network including the MSC, HLR, VLR and PDSN, the present invention can also be applied to a different mobile communication network structure including other elements similar to the MSC, HLR, VLR and PDSN.

Next, an operation of the embodiment will be described with reference to a radio channel structure of the CDMA-2000 wireless communication network.

In order to support the radio data service, the mobile station and the base station system require a path over which they can exchange signaling information, and this path is called a channel. In the CDMA-2000 system, the channels for exchanging the signaling information include a fundamental channel (FCH) and a dedicated control channel (DCCH), and the mobile station and the base station system can exchange signaling messages using these channels. Here, the FCH is used for transmitting voice signals and the DCCH is used for transmitting control information. Further, both the FCH and DCCH can perform a function of exchanging dedicated control information with the mobile station in session. Although it is possible for the FCH and the DCCH to transmit and receive the traffics for the packet data service, these channels transmit and receive a very small amount of the packet data through a path with a very low data rate. Further, a packet data service using the FCH and DCCH does not separately require channel assignment and scheduling. Therefore, an operation of transmitting and receiving the packet data over the FCH and DCCH will be omitted in the following description.

However, unlike in the FCH and the DCCH, exchange of high-speed packet data between the mobile station and the base station system is performed through a separate dedicated channel. For example, the CDMA-2000 system includes a supplemental channel (SCH) for exclusively communicating the data, and supports a high-speed radio packet data exchange function between the base station system and the mobile station by using the SCH channel. The relationship between the SCH and the FCH/DCCH is as follows. The FCH and the DCCH are maintained even when there is no data exchange between the mobile station and the base station system, and these channels are chiefly used for transmitting and receiving the signaling messages. Therefore, when an amount of the packet data traffic to be exchanged is increased, the base station system assigns an SCH channel for communicating the packet data at the high data rate by exchanging the signaling messages over the FCH or the DCCH with the mobile station. When the SCH is assigned, the high-speed packet traffics are exchanged between the mobile station and the base station system over the SCH. Thereafter, when there is no traffic to transmit and receive, the base station system and the mobile station exchange signaling messages for releasing the assigned channel over the FCH and the DCCH, and then, release the assigned SCH. Here, it is also possible to release the assigned SCH channel without exchanging the signaling messages for releasing the assigned channel between the base station system and the mobile station.

Therefore, the high-speed radio traffic channel used in the method for scheduling, assigning and releasing the packet traffic channel, according to an embodiment of the present invention, is assumed to be mapped to the SCH channel of the CDMA-2000 system, and the path (or channel) for exchanging the signaling messages for assigning the high-speed radio traffic channel between the mobile station and the base station system is defined as the FCH or DCCH.

Now, a detailed description of the embodiment of the present invention will be made.

In the high-speed wireless communication network, a CDMA-2000 base station system according to an embodiment of the present invention schedules a radio traffic channel on a packet switching basis and then, assigns the packet traffic channel according to the scheduling results.

In general, the radio traffic channel can be assigned in two different methods: one is a circuit method and another is a packet switching method. The circuit method has a structure in which a radio traffic channel is assigned to a specific mobile station and then, other users cannot use the assigned radio traffic channel regardless of whether the specific mobile station actually transmits and receives the traffic over the assigned channel, as in the traffic channel assignment in voice service. The packet switching method has a structure in which only the subscriber who actually needs to transmit and receive the packet requests assignment of the radio traffic channel, and an assignment time of the radio traffic channel is also limited. Therefore, when the channel is assigned in the packet switching method, a "pipe" is assigned to every user for a predetermined time and after the expiry of the time, the pipe is assigned to another user. In the following description, the term "pipe" will have the same meaning as the term "channel". In general, the circuit method is applied to, for example, a voice service in which the traffic arrives continuously. However, the packet switching method is applied to, for example, an Internet service in which the traffic has a burst property and thus arrives intermittently. The circuit method can be supported in the same method as used in assigning the voice channel.

Therefore, in the embodiment of the present invention, processing the SCH on the circuit basis is assumed be performed as follows. Herein, a technique for assigning and scheduling a radio traffic channel on the packet switching basis will be described, while a description of a method for operating a radio packet data channel on the circuit basis will not be provided. In addition, it will be assumed herein that the scheduling method described in the embodiment of the present invention is performed on the band remaining after supporting the voice call and the circuit data call.

In the embodiment of the present invention, several new terms are defined as follows, in order to assign and schedule the radio traffic channel.

First, the term "radio traffic channel assignment time" is defined as an SCH setup time (SS_Time), since the radio traffic channel is the SCH in the CDMA-2000 system. The radio traffic channel assignment time is a time required when the base station system and the mobile station complete preparations for transmitting and receiving the radio traffic channel and then actually transmit and receive the traffic by starting radio traffic channel processing, after a scheduler for the radio traffic channel determines assignment of the radio traffic channel (SCH). As the radio traffic channel assignment time becomes shorter, it is possible to rapidly assign the radio traffic channel.

The radio traffic channel assignment time can be set to 0 ms, when there is no need to continuously exchange the signaling messages for assigning the radio traffic channel between the base station system and the mobile station, as in the method using the variable data rate, the discontinuous transmission of the SCH and the scrambling code.

Second, the term "scheduling interval of the radio traffic channel" refers to a scheduler operation parameter $R_{SCHEDULING\_INTERVAL}$ described below. The scheduling interval of a radio traffic channel indicates an interval for which the radio traffic channel scheduler is periodically activated to operate. As the assignment and scheduling interval of the radio traffic channel becomes shorter, the system load increases more and more, but it is possible to efficiently transmit the packet data traffic and to rapidly cope with the change in the radio channel.

Third, the term "transmission unit time of the radio traffic channel" is a minimum time unit required in assigning the radio traffic channel, and N times the minimum time unit (where N=1,2,3,4, . . . ) is defined as a data transmission duration $R_{DURATION}$. In the following description, it will be assumed that the transmission unit time of the radio traffic channel is 20 ms, since a frame period of the data transmitted over the SCH channel is 20 ms in the CDMA-2000 system. In the embodiment of the present invention, $R_{DURATION}$ will be referred to as "data transmission duration" for transmitting the packet data over the radio packet data channel. As the unit time for transmitting the data over the radio traffic channel becomes shorter, the radio traffic channel is more frequently assigned and released, causing an increase in an amount of the channel assignment-related messages being exchanged between the mobile station and the base station system in the wireless link.

The embodiment of the present invention manages assignment and scheduling of a forward radio traffic channel transmitted from the base station system to the mobile station. In this connection, the radio data service generally has an asymmetric property. That is, there is a small amount of the packet traffic on the reverse link transmitted from the mobile station to the base station system, whereas there is a great amount of the packet traffic on the forward link transmitted from the base station system to the mobile station. Therefore, in order to maximize the efficiency of the radio resources, it is necessary to increase the efficiency of the forward radio traffic channel. Therefore, in the embodiment of the present invention, it will be assumed that only an operation of the forward radio traffic channel is considered, and a channel having a low data rate is assigned for the reverse radio traffic channel. In addition, it will be assumed that assignment of the reverse radio traffic channel (R-SCH) follows a call admission control (CAC) process of the FCH and the DCCH.

In the embodiment of the present invention, it is possible to provide a simple structure and a complex structure by controlling an operation parameter. For example, to support the simple structure, the method according to an embodiment of the present invention can set the operation parameter as follows. That is, a single radio traffic channel structure is supported as a fat-pipe structure (i.e., a structure for operating one or a small number of the SCH channels in order to transmit the packet data at a high data rate), and the duration $R_{DURATION}$ for transmitting data over the radio traffic channel is equally assigned to the subscribers, thereby facilitating the development and experiment of system parameters.

It might be necessary to adjust several parameters when implementing the embodiment of the present invention. That is, when the embodiment of the present invention is applied to the CDMA-2000 system, there may arise the following limitations, which are adaptive to the technologies to be applied and exert no influence on the substance of the invention.

First, when it is intended to maximize a quality of the voice service, the power allocated for the data service according to a voice band allocation value α can be used for the channel assignment for the data service during the CAC process, and the power remaining in the voice service band during SCH scheduling cannot be used for SCH assignment. That is, in the embodiment of the present invention, it is assumed that the remaining power, except the power set for the voice service, is used for the SCH assignment. However, in order to increase a processing rate of the data service, it is also possible to use the unused power in the voice service band (i.e., the reserve power presently unused for the voice service out of the power set for the voice service).

Second, the base station system (BSS) performs scheduling to assign the SCH to the mobile stations in a unit of the set scheduling interval $R_{SCHEDULING\_INTERVAL}$. In the embodiment of the present invention, the scheduling interval $R_{SCHEDULING\_INTERVAL}$ is assumed to be 260 ms. However, it is also possible to set the scheduling interval of the SCH to over or below 260 ms.

Third, the base station system (BSS) collects radio information for the SCH scheduling at intervals of 260 ms.

Fourth, when a frame offset of the SCH is the same as that of the FCH/DCCH, there may occur a frame offset collision between the subscribers assigned the SCH in the same scheduling interval. To prevent this, the frame offset of the SCH is assigned separately from the FCH/DCCH, or a guard interval is assigned to disperse the collision points when there exists no frame offset of the SCH.

Fifth, when the base station system (BSS) is divided into the base station controller (BSC) and the base transceiver system (BTS), the BSC can support the flow control with the BTS such that a predetermined amount of RLP (Radio Link Protocol) packets exist in the BTS.

Sixth, the BTS supports RLP packet buffering, sequence management, and reservation of RLP packet transmission during DTX (Discontinuous Transmission), and reports "a sequence of the last transmitted RLP packet" to the BSC through an inband path.

Seventh, in the embodiment of the present invention, the data transmission duration $R_{DURATION}$ of the SCH is assumed to be 80 ms. However, it is also possible to set the data transmission duration of the SCH to over or below 80 ms.

Eighth, ESCAM (Extended Supplemental Channel Assignment Message) for the SCH assignment can avoid an ACK/NACK process.

Ninth, when the FCH/DCCH supports a soft handoff so that there are two or more legs for the mobile station, a leg selection algorithm is performed. One of the two or more legs is selected by performing the leg selection algorithm. Here, the leg is one of the base transceiver systems (BTSs).

In addition, the following operation parameters are defined in the invention.

The "scheduling interval $R_{SCHEDULING-INTERVAL}$" indicates a time for which a radio traffic channel scheduler is periodically activated to assign and schedule the radio traffic channel.

Preferably, a value of the scheduling interval $R_{SCHEDULING-INTERVAL}$ should be set to be larger than or equal to a time value required when the base station system (BSS) assigns the radio traffic channel to the mobile station ($R_{SCHEDULING-INTERVAL} \geq$ (a time required when the base station system assigns the radio traffic channel to the mobile station)).

The "data transmission duration $R_{DURATION}$" is a duration for which the radio traffic channel scheduler assigns the radio traffic channel to the mobile stations, and the data transmission duration of the radio traffic channel indicates a duration (or time) for which the corresponding mobile station can exclusively communicate with the base station system through the radio packet data channel for the duration $D_{DURATION}$. In the embodiment of the present invention, the data transmission duration is assumed to be 80 ms, as stated above. Further, in the embodiment of the present invention, the duration $R_{DURATION}$ is equally set for every mobile station. However, it is also possible to variably set the duration $R_{DURATION}$ depending on the classification of the mobile stations.

"β" is a time value required in sorting the frame offset, when there exists a frame offset of the radio traffic channel in the CDMA-2000 system, and the value β is defined as 20 ms. When the frame offset of the radio traffic channel is 0 ms, the value β is set to 0.

Table 1 below shows recommended parameter values for the method of scheduling the SCH of the CDMA-2000 system according to an embodiment of the present invention.

TABLE 1

|  | $R_{SCHEDULING-INTERVAL}$ | $R_{DURATION}$ |
| --- | --- | --- |
| 1st Recommended Value (Default) | 260 ms (= 80 ms × 3 + β ms) | 80 ms |
| 2nd Recommended Value (Optional) | 260 ms (= 40 ms × 6 + β ms) | 40 ms |

For the description of the packet channel assignment and scheduling technique, the embodiment of the present invention will be considered with reference to the base station system (BSS) which is divided into the BSC and the BTS. In addition, the embodiment will be described with reference to an environment in which the BSC and the BTS are logically implemented in several processors. This is to give a clear description of the present invention. In practice, however, the several processors can be designed into one processor, and the BSC and the BTS can also be designed into a single base station system device. In particular, the embodiment of the present invention will be described with reference to only the processors required when supporting the radio packet data service.

First, a description will be made of the BSCs 111-11M shown in FIG. 3.

A main media control processor (MMCP) is a media control processor, which supports a function of controlling a path for transmitting and receiving the actual packet data and supports an error control function. In the CDMA-2000 system, the MMCP provides interfacing with an RLP (Radio Link Protocol) layer, a MAC (Medium Access Control) layer, and a wired Internet network. The MMCP provides an RMCP (Radio Media Control Processor) with the packet data to be transmitted to the respective users, by using the flow control function.

A main call control processor (MCCP) is a call control processor, which provides a principal function of processing the signaling messages between the mobile station and the base station system, and a function of transmitting and receiving a radio traffic channel assignment message. In addition, the MCCP supports a function of collecting information about pilot strength received from the mobile station and providing the collected pilot strength information to the MMCP.

Second, a description will be made of the structure of the BTSs 101-10N shown in FIG. 3.

A radio resource management processor (RRMP) supports a function of assigning the radio traffic channel to specific users by considering the radio channel information together with radio media control processor (RMCP) buffer information of the BSC. The RRMP is a processor for performing the scheduling function to actually assign the radio traffic channel. That is, the RRMP has an SCH scheduling function according to an embodiment of the present invention.

A radio information measurement processor (RIMP) performs a function of collecting the radio channel information and providing the collected radio channel information to the BSC and the RRMP.

A radio media control processor (RMCP) buffers the packet data of the respective users received from the MMCP through the flow control function, and requests assignment of the SCH radio traffic channel by providing the RRMP with information about amount of the buffered user packet. When the radio traffic channel is assigned by the RRMP, the RMCP transmits the received packets to the radio traffic channel for the assigned time.

In the embodiment of the present invention, an operation of scheduling and assigning the radio packet traffic channel will be described with reference to the CDMA-2000 communication system.

Figure 4:
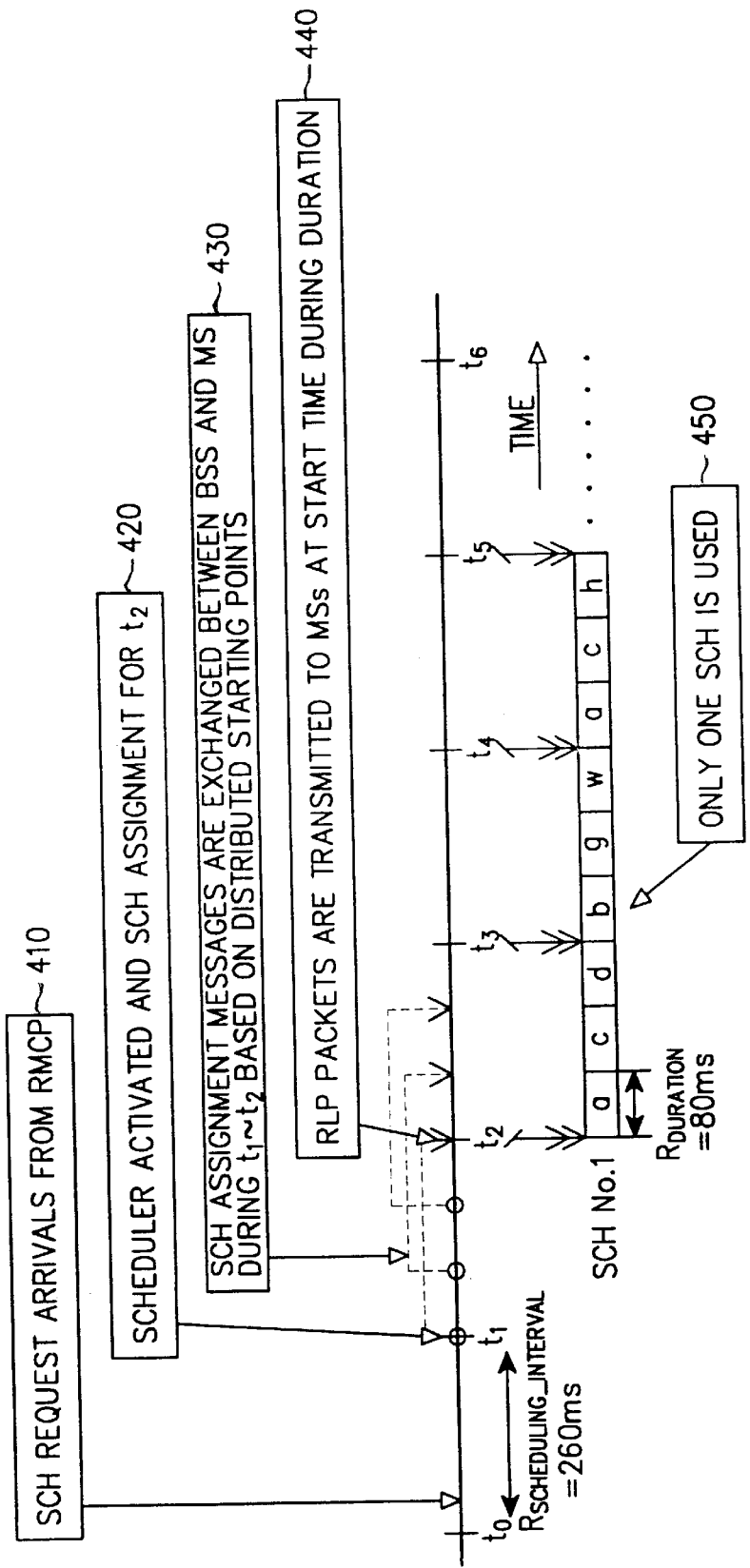
FIG. 4 is a diagram illustrating a method for assigning a radio traffic channel in a wireless communication network according to an embodiment of the present invention.

FIG. 4 shows a method for assigning and scheduling a packet traffic channel in the wireless communication network of FIG. 3 according to an embodiment of the present invention.

FIG. 4 shows a scheduling operation for the case where the high-speed radio packet traffic channel is an SCH in the CDMA-2000 system. With reference to FIG. 4, an operation according to the embodiment of the present invention will be described step by step. Here, the RRMP includes a function of a collector for collecting an SCH use request signal to schedule and assign the radio traffic channel, a function of a scheduler for scheduling use of the SCH, and a function of a message generator for generating a scheduling message using the scheduled results.

In FIG. 4, intervals $t_0-t_1$, $t_1-t_2$, $t_2-t_3$, $t_3-t_4$, $t_4-t_5$, ... are scheduling intervals $R_{SCHEDULING\_INTERVAL}$ and in the embodiment of the present invention, each interval is 260 ms. At step 410, in the interval $t_0-t_1$, the collector of the RRMP collects the SCH use request. In the interval $t_1-t_2$, the scheduler is activated to assign the channel (step 420) by scheduling the mobile stations so that they can use the SCH in an interval following the point $t_2$, and the message generator generates a channel assignment message (here, an ESCAM message) for the mobile stations. Here, the SCH use request signal collected by the collector is generated in the RMCP of the base station system. That is, the SCH scheduling according to an embodiment of the present invention is applied to the SCH of the forward link. Accordingly, the SCH use request signal is generated when it is necessary to transmit packet data on the forward link. Therefore, the SCH use request signal is generated by the base station system when the base station system transmits packet data to a specific mobile station over the SCH of the forward link. In addition, when the channel assignment messages are simultaneously transmitted to the channel assignable mobile stations, the packet data has a burst property because of the messages. Accordingly, it is preferred to distribute the channel assignment messages as shown in step 430 of FIG. 4. Here, the channel assignment message includes information about a start time of the SCH, a data rate of the SCH channel and a data transmission duration $R_{DURATION}$. Then, in the interval $t_2-t_3$, at step 440, the mobile stations communicate the radio packet data over the SCH at the set start time at the set data rate for the set data transmission duration $R_{DURATION}$. In the interval $t_2-t_3$ of the SCH channel, the base station system (BSS) transmits the packet data for the corresponding mobile stations in the data transmission duration $R_{DURATION}$ of the radio traffic channel shown by reference numeral 450. That is, the base station system can sequentially transmit the packet data to a plurality of the mobile stations (3 mobile stations in FIG. 4) in one scheduling interval according to the scheduled order. The mobile stations then turn ON the SCH at the start point of the assigned data transmission duration to receive the packet data, and automatically turn OFF the SCH at an end point of the data transmission duration.

To sum up, in the first scheduling interval $t_0-t_1$, the SCH use request signal is collected (step 410) as shown in FIG. 4. In the second scheduling interval $t_1-t_2$, the scheduler of the base station system is activated (step 420) to assign the SCH by scheduling the mobile stations according to the collected SCH use request. The SCH is assigned such that the mobile stations have different start points of the SCH in one scheduling duration (step 430). Then, the channel assignment messages including information about the data rate to be used at the set start point and the transmission duration are generated, and the generated channel assignment messages are transmitted at distributed starting points to the corresponding mobile stations. Thereafter, in the third scheduling interval $t_2-t_3$, the base station system sequentially transmits the radio packet data to the mobile stations over the SCH at the set start points according to the channel assignment messages (step 440).

The above SCH scheduling and assignment operation is continuously performed. That is, when the SCH is used as shown in FIG. 4, the collector collects the SCH the packet traffic transmission requests including a, c and d mobile stations in the interval $t_0-t_1$.

In the interval $t_1-t_2$, the scheduler is activated to schedule the a, c and d mobile stations intended to use the SCH channel, and the message generator generates the SCH assignment message according to the scheduled results and transmits the generated message. At this moment, the collector collects the SCH the packet traffic transmission requests including b, g and w mobile stations.

In the interval $t_2-t_3$, the RMCP transmits the radio packet data to the SCH-assigned mobile stations a, c and d over the SCH for the set data transmission duration $R_{DURATION}$. In addition, the scheduler is activated to schedule the b, g and w mobile stations, and the message generator generates the SCH assignment message according to the scheduled results and transmits the generated message. At this moment, the collector collects the SCH the packet traffic transmission requests including a, c and h mobile stations.

As described above, it is noted that the SCH use request, the assignment of the SCH channel, and transmission of the radio packet data through the assigned SCH are simultaneously performed in each scheduling interval. Such an operation is continuously performed. In addition, it is noted from the foregoing description that the assignment and release of the SCH is performed at the scheduling intervals. Therefore, the SCH channel is rapidly assigned and released, thus making it possible to maximize utilization efficiency of the SCH.

The detailed description of the above operation will be made below.

First, in step 410 of FIG. 4, when the base station system has packet data to transmit to the mobile stations, the RMCP generates an SCH use request signal and the collector in the RRMP collects the SCH use request information.

More specifically describing an operation of the step 410, the traffics received from the wired packet data network are buffered by the MMCP in the BSC, and the MMCP provides the BTS with information about arrival of the packet and amount of the received traffics. In this case, the information provided to the BTS may include only the buffer size information of the MMCP, or the actual RLP packet can be provided to the RMCP of the BTS through the flow control function between the RMCP and the MMCP. The embodiment of the present invention will be described with reference to the case where the actual traffic is provided to the RMCP. The RMCP provides the data amount information of the RMCP buffer to the RRMP in the BTS. As a method for informing the RRMP of the buffer size, the RMCP periodically provides either the entire MS information in the RMCP or the buffer size information of the individual MS so that the RRMP collects the information.

Second, in step 420 of FIG. 4, the scheduler is activated to assign the SCH for the mobile stations intended to use the SCH in the next scheduling interval.

More specifically describing an operation of the step 420, the SCH channel assignment algorithm of the RRMP is activated at every scheduling interval $R_{SCHEDULING\_INTERVAL}$. For the intellectual application of QoS (Quality of Service) in the RRMP, it is possible to apply a PFQ (Pseudo Fair Queuing) algorithm. The RRMP assigns information about an SCH code number, a start time, and a data transmission duration $R_{DURATION}$ of the radio traffic channel to the corresponding MS according to the SCH channel assignment algorithm. The RRMP provides the SCH assignment message to the MCCP according to the assigned information. The RRMP provides the SCH assignment message to the RMCP to process the buffering and start time.

Third, in step 430 of FIG. 4, the SCH channel assignment messages assigned in step 420 are dispersedly transmitted to the mobile stations, such that the messages are distributed at intervals of time.

More specifically describing an operation of the step 430, the MCCP exchanges signaling messages with the mobile stations according to the received SCH assignment messages. The start points where the BSS starts exchanging the signaling messages for the SCH assignment are distributed over the scheduling interval $R_{SCHEDULING\_INTERVAL}$ according to the start time assigned to the respective mobile stations.

Fourth, in step 440 of FIG. 4, the respective mobile stations communicate the RLP packet data to the base station system over the SCH channel at the set start time for the set transmission duration.

More specifically describing an operation of the step 440, the MMCP provides the RLP packet to the RMCP through the flow control function according to the data rate and the data transmission duration of the radio traffic channel, and the RMCP transmits the traffic at the assigned start time at the set data rate for the data transmission duration $R_{DURATION}$ of the radio traffic channel.

Fifth, in step 450 of FIG. 4, the RLP packet data is actually transmitted over the SCH channel between the base station system and the mobile stations in the scheduling duration.

More specifically describing an operation of the step 450, the start time and the data rate for transmission of the radio packet, assigned in the RRMP, may be different for the respective subscribers. In step 450, the number of the SCH channels is assumed to be one. However, the number of the SCH channels can be greater than one. The transmission start time of the radio packet traffic transmitted over the SCH channel can be different for the respective subscribers in the next scheduling interval $R_{SCHEDULING\_INTERVAL}$. In step 450, it is assumed that the packet traffic data transmission duration $R_{DURATION}$ is fixed to a specific value of, for example, 80 ms. However, the data transmission duration $R_{DURATION}$ can be variably set according to the subscribers.

That is, in the radio packet data channel communication device for the base station system in the mobile communication system according to an embodiment of the present invention, the RRMP performs a function of the collector for collecting the SCH the packet traffic transmission requests, a function of the scheduler for scheduling use of the SCH channel, and a function of the message generator for generating messages according to the scheduled results. First, describing an operation of the collector, the RMCP receives the radio packet data channel the packet traffic transmission requests transmitted from the mobile stations and transmits the received channel the packet traffic transmission requests to the RRMP, and then, the collector in the RRMP collects the channel the packet traffic transmission requests from the RMCP. Second, describing an operation of the scheduler, the RRMP selects at least one of the mobile stations which had requested use of the radio packet data channel, so as to schedule the radio packet data channel, and then, the selected mobile station determines the data rate, the data transmission duration in which the radio packet data channel can be used, and the start time of the data transmission duration. Third, describing an operation of the message generator, the RRMP transmits the determined SCH assignment information to the RMCP, the RMCP transmits the channel assignment message to the MMCP of the BSC through the inband path, and the MMCP transmits the received channel assignment message to the MCCP. The MCCP then generates the radio packet data channel assignment messages including the SCH assignment information.

Then, a channel transmitter for the physical layer of the BTS transmits the radio packet data channel assignment message to the mobile station. Thereafter, the channel transmitter transmits data over the radio packet data channel at the scheduled start point for the determined transmission duration, and releases the SCH channel to the mobile station at a transmission end point.

Figure 5:
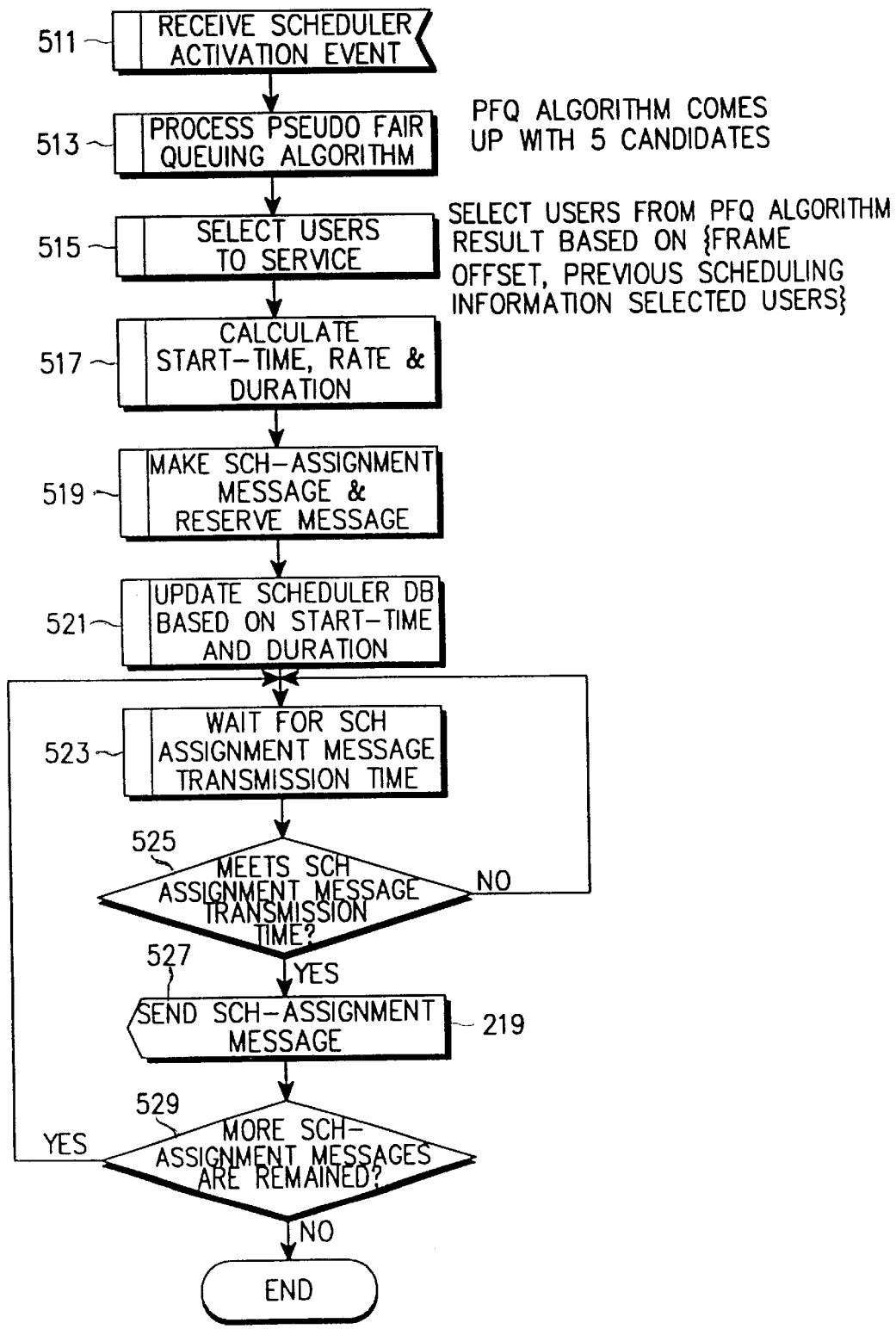
FIG. 5 is a flow chart illustrating a procedure for assigning a radio traffic channel in a wireless communication system according to an embodiment of the present invention.

FIG. 5 shows a traffic channel assignment algorithm according to an embodiment of the present invention. The RRMP performs the radio traffic channel assignment and scheduling operation at the scheduling interval $R_{SCHEDULING\_INTERVAL}$.

Referring to FIG. 5, in step 511, the RRMP of the BTS periodically collects the SCH the packet traffic transmission requests from the mobile stations and activates a program for assigning and scheduling the radio traffic channel. In the CDMA-2000 system, since the radio traffic channel is mapped to the SCH channel, a module for assigning and scheduling the radio traffic channel will be called an SCH scheduler. In step 513, the SCH scheduler selects the mobile stations which can use the SCH channel, out of the mobile stations which have requested use of the SCH channel. In the embodiment of the present invention, it is assumed that the SCH scheduler first selects 5 mobile stations out of the mobile stations which have requested use of the SCH channel, and then selects 3 mobile stations out of the selected 5 mobile stations. Therefore, in the embodiment of the present invention, it is assumed that 3 mobile stations can use the SCH in one scheduling interval. For the method for selecting the 5 candidate mobile stations in step 513, it is possible to apply an intellectual QoS supporting scheme such as the PFQ (Pseudo Fair Queuing) algorithm, and as a result, the candidate subscribers to which the SCH is to be assigned are selected. Here, the QoS parameters may include the subscriber class, the message class and the data size. Thereafter, in step 515, the SCH scheduler finally selects the mobile stations which have no frame offset collision in the environment where the SCH uses the frame offset, based on the 5 candidate mobile stations. The embodiment of the present invention will be described with reference to the case where the number of the finally selected mobile stations is 3. Thereafter, in step 517, the scheduler calculates the data rate of the SCH channel, the start time of the SCH channel and the end point of the SCH channel (i.e., an end point of the data transmission duration), for the respective selected subscribers.

In steps 519 and 521, the SCH scheduler updates a scheduler database using the last calculated information and then, sends the MCCP a request for exchange of the SCH assignment message with the mobile station. At this moment, the MCCP of the BSC dispersedly transmits the SCH assignment messages based on the SCH assignment start time for the respective mobile stations. By doing so, it is possible to suppress an increase in the noises occurring when the SCH assignment messages are simultaneously transmitted over the radio channel. In addition, by dispersedly transmitting the SCH assignment messages, it is possible to solve a problem that the SCH assignment message assigned to the mobile station in the previous scheduling interval is confused with the present SCH assignment message. That is, in the CDMA-2000 mobile communication system to which the present invention is applied, if the SCH assignment message is received in the previous scheduling interval and a new SCH assignment message is received in the next scheduling interval before transmitting and receiving data over the assigned SCH, the mobile station will confuse the two SCH assignment messages. In this case, the mobile station discards the first received SCH assignment message. Therefore, if the SCH assignment messages are dispersedly transmitted as stated above, the mobile station receives the next SCH assignment message at the point (or after the point) where the message is transmitted over the previously assigned SCH channel, thus solving the confusion problem.

Thereafter, in steps 523 and 525, the base station system waits until SCH assignment message transmission time arrives. Herein, when the SCH assignment message time arrives, the base station transmits the SCH assignment message in step 527. In addition, in step 529, if there remains any SCH assignment message, which waits for the arrival of the SCH assignment message transmission time, then the procedure returns to step 523. Meanwhile, in steps 527 to 529, when start time included in the arrived SCH assignment message comes, data transmission is performed during the transmission duration at a set data rate. According to the preferred embodiment of the present invention, the above operation is repeated three times.

Figure 6:
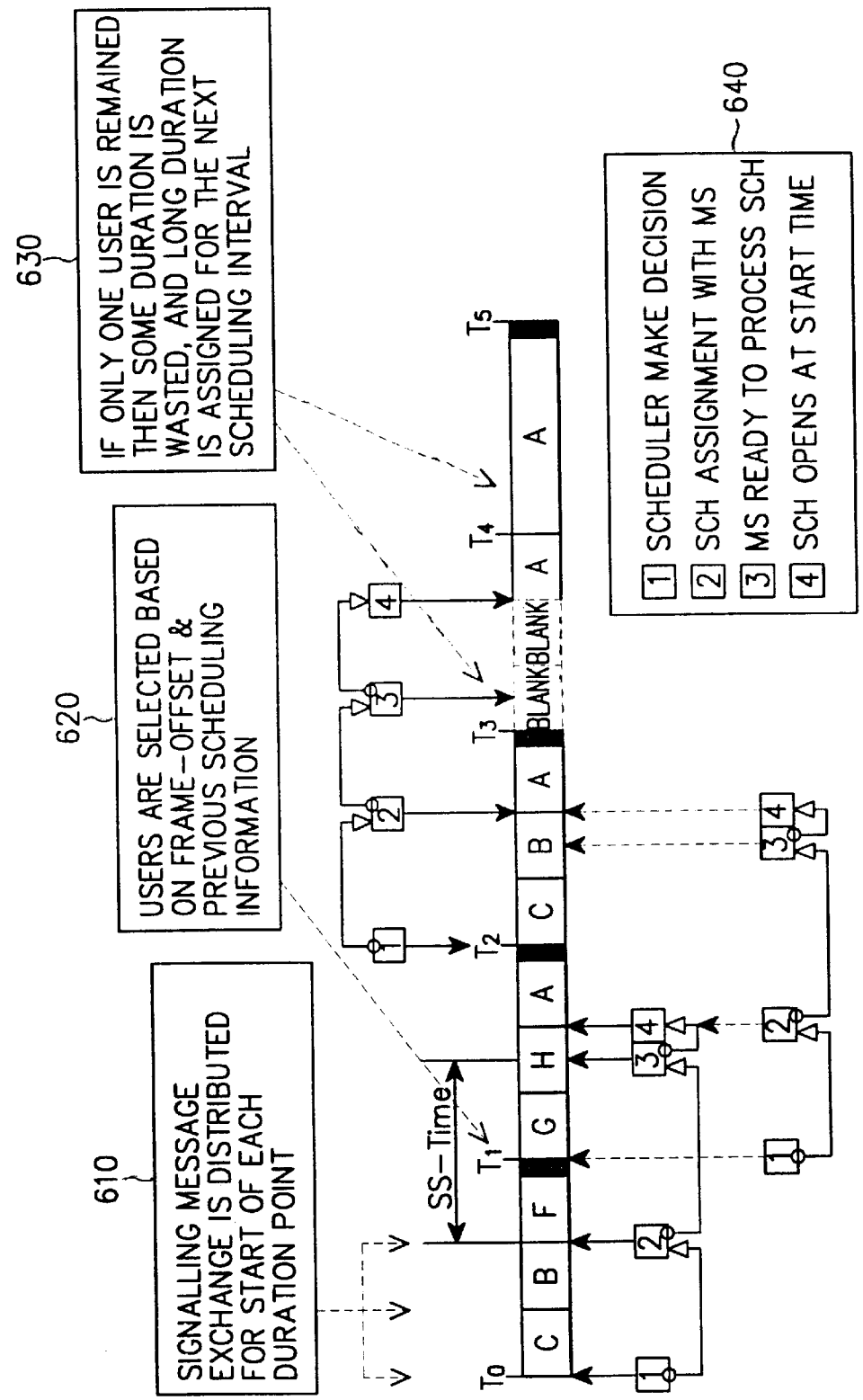
FIG. 6 is a diagram illustrating an example where a radio traffic channel in the worst condition is assigned in a wireless communication system.

It is possible that the scheme proposed in the invention might have limitations due to the frame offset of the SCH in the current CDMA-2000 standard. A solution of this problem is shown in FIG. 6. As shown by reference numeral 640, "[1]" indicates a point where the scheduler makes a decision, "[2]" indicates a point where the SCH is assigned to the mobile station, "[3]" indicates a point where the mobile station is ready to process the SCH, and "[4]" indicates a point where the SCH opens at the start time.

Referring to FIG. 6, as shown by reference numeral 610, the SCH messages are dispersedly exchanged at the start points of each transmission duration. As shown by reference numeral 620, the users are selected based on the frame offset and the previous scheduling interval information. That is, when the frame offset of the SCH is assigned to be equal to the frame offset of the FCH/DCCH, the users assigned to the present scheduling interval $R_{SCHUDULING\_INTERVAL}$ are selected from the users selected by the PFQ algorithm based on the following criteria. Five candidate subscribers assigned the SCH in the PFQ algorithm are first selected, and the scheduler then selects 3 subscribers who have no frame offset collision, out of the subscribers selected as a result of the PFQ. In this case, when the subscriber who was assigned the last RLP frame data transmission duration $R_{DURATION}$ in the previous scheduling interval is selected as a candidate by the PFQ in the present scheduling interval $R_{SCHEDULING\_INTERVAL}$, the selected candidate subscriber is assigned to the last data transmission duration $R_{DURATION}$ of the present scheduling interval $R_{SCHEDULING\_INTERVAL}$ in order to avoid the collision between the data transmission durations $R_{DURATION}$ of the radio traffic channel due to the scheduling setup time (SS_Time). When there still occurs the frame offset collision, another subscriber is assigned to the last data transmission duration.

That is, in the data transmission duration (i.e., G and H user's data transmission durations) before an A user transmits the packet data over the assigned SCH in an interval $T_1$–$T_2$ of FIG. 6, it is scheduled that the SCH assignment message to be used by the A user in the next interval $T_2$–$T_3$ is not transmitted. Herein, in case that the SCH assignment message of A user to be assigned in the interval T2–T3 is transmitted before the packet data of A user is transmitted in the interval T1–T2, data of A user between in the interval T1–T2 and in T2–T3 may be interfered with each other. In addition, as shown by reference numeral 630, if only one mobile station (i.e., the A user in an interval $T_3$–$T_4$ of FIG. 6) intends to use the SCH, the RRMP scheduler can assign the entire data transmission duration $R_{DURATION}$ (i.e., an interval $T_4$–$T_5$ of FIG. 6) of the radio traffic channel in the scheduling interval to the single mobile station, as in the third SCH assignment process for the A user in FIG. 6.

Figure 7:
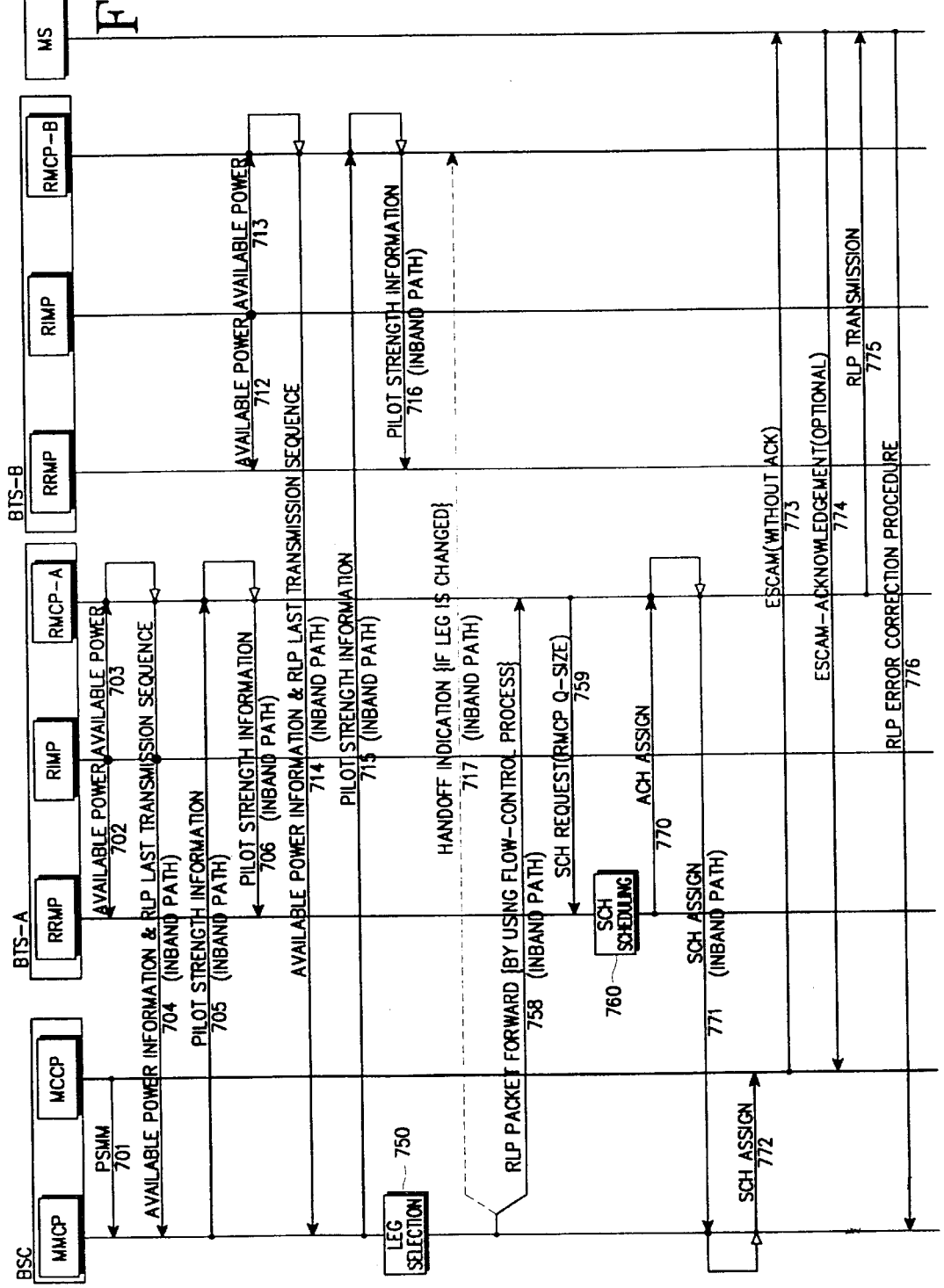
FIG. 7 is a diagram illustrating a procedure for exchanging a signaling message for assigning a radio traffic channel in a wireless communication network according to an embodiment of the present invention.

FIG. 7 shows a call processing procedure for assigning and scheduling a radio packet traffic channel in the CDMA-2000 system according to an embodiment of the present invention. In the basic environment, the RRMP scheduler transmits the RLP packet to the RMCP, and the RMCP buffers the RLP packets received from the BSC and sends an SCH assignment request to the RRMP. In FIG. 7, BTS-A refers to a selected BTS, and BTS-B refers to an old BTS.

Referring to FIG. 7, the MCCP of the BSC sends pilot strength information of the corresponding mobile station (MS) to the MMCP in step 701. In this connection, if a report interval (or transmission duration) of PSMM (Pilot Strength Measurement Message)/PSMMM (Pilot strength Measurement Mini Message) of the mobile station is equal to that of PMRM (Power Measurement Report Message), the reverse link quality will be decreased. Accordingly, in this case, it is preferable for the mobile station to asynchronize the transmission time with the frame level.

In steps 702 and 703, the RIMP of the BTS-A sends information about available power for the SCH to the RRMP and RMCP. Sending the available power information from the RIMP to the RRMP is to determine the data rate of the SCH, and sending the available power information from the RIMP to the RMCP is to select a leg. Then, in step 704, the RMCP sends the available power information received from the RIMP and the last transmitted RLP sequence to the MMCP through the inband path. Here, the reason that the RMCP transmits the sequence number of the last transmitted RLP to the mobile station is to support the DTX function. That is, in the embodiment of the present invention, the BTS controls transmission of the RLP frame according to the environment of the channel link. Specifically, the BTS buffers the internal RLP frame information, and then controls transmission of the buffered RLP frame information according to the channel environment. Therefore, the BTS does not send an RLP retransmission request to the BSC, and instead, simply transmits the last number of the presently transmitted RLP frame to the BSC. Since the BSC knows the size of the RLP frame transmitted from the BTS, the BSC can determine the RLP frame transmission status of the BTS according to the RLP frame number reported from the BTS.

Upon receipt of the available power information and the last transmitted RLP sequence number from the RMCP, the MMCP sends the pilot strength information of the corresponding mobile station, received in step 701, to the RMCP through the inband path, in step 705. Thereafter, in step 706, the RMCP sends the pilot strength information of the mobile station received from the MMCP to the RRMP.

In steps 712 to 716, the BTS-B also transmits the available power for the SCH and the last transmitted RLP frame number to the BSC in the same process as performed in the steps 702 to 706 by the BTS-A. Here, the BTS-A and the BTS-B become the legs for a specific mobile station.

If there are two legs for a specific mobile station as stated above, the MMCP performs a leg selection algorithm in step 750. A detailed description of the leg selection algorithm will be made later with reference to FIG. 8. If the leg is changed by the leg selection algorithm, the MMCP sends a handoff indication message to the RMCP-B (or old RMCP) through the inband path in step 717. Upon receipt of the handoff indication message, the RMCP-B flushes the buffer after transmitting the RLP packet until the assigned data transmission duration, if assignment of the SCH to the mobile station is not completed. The packet sequence last transmitted by the RMCP-B is transmitted to the MMCP in the same method as performed in step 704.

In step 758, the MMCP sends the RLP frame to the RMCP-A of the BTS which is to assign the SCH to the corresponding mobile station. Transmission of the RLP frame is performed by a flow control algorithm between the MMCP and the RMCP-A, and the transmission amount is determined such that a buffer capacity of the RMCP-A for the mobile station should maintain a specific boundary. Then, in step 759, the RMCP-A periodically or separately sends SCH assignment request messages including the RLP Q-Size information of the mobile stations to the RRMP.

In step 760, the RRMP-A performs SCH scheduling in the same method as described in FIG. 5. Thereafter, in step 770, the RRMP-A sends SCH assignment information for the mobile station to the RMCP-A according to the scheduling results determined by the scheduler. In step 771, the RMCP-A then sends the SCH assignment information to the MMCP through the inband path according to the scheduling results determined by the scheduler. In reply to the SCH assignment message, the MMCP sends an SCH assignment command to the MCCP in step 772. The MCCP then performs a process for transmitting and receiving SCH assignment messages for the mobile station in step 773. In this case, a retransmission function of L2 (Layer-2) is not applied to the ESCAM. Upon receipt of the ESCAM transmitted from the MCCP, the mobile station can additionally send an acknowledgement signal ACK for the ESCAM in step 774.

Thereafter, in step 775, the RMCP-A transmits the RLP packet to the mobile station at the start time for the data transmission duration, and in the DTX mode, the RMCP-A defers transmitting the RLP packet. Further, the RMCP-A transmits a sequence number of the last transmitted RLP frame to the MMCP through the inband path as in the step 704. In addition, RLP retransmission due to occurrence of an RLP frame error is performed between the MMCP of the BSC and the RLP of the mobile station at step 776.

In the leg selection process of step 750, if there are two or more legs for the mobile station, the MMCP performs an operation of selecting a leg for the mobile station by activating the leg selection algorithm. Further, the SCH scheduling process of step 760 is performed as described in FIG. 5, and in this process, the RRMP selects the mobile station to be assigned the SCH according to the PFQ algorithm, based on the RLP buffer size reported from the RMCP, and calculates a start point of the assigned SCH and an end point of the data transmission duration of the radio traffic channel.

The embodiment of the present invention provides the leg selection algorithm, taking into consideration the case where the mobile station performs a handoff through the FCH and the DCCH. In this case, the mobile station is in the state where the mobile station communicates with two BTSs (i.e., a handoff state where two BTSs are connected to one mobile station through the FCH and/or the DCCH). Therefore, two legs are connected to the BSC for the old BTS and a new BTS. Since the SCH has a fat pipe structure in which one or a small number of channels are used, the SCH consumes very high transmission power as compared with the FCH or the DCCH. Therefore, when the SCH is connected to two or more legs in the handoff state, there occur large noises. Hence, it is preferable that the SCH should be connected to one leg even in the handoff state.

First, as an information collecting time unit, a PMRM report interval is a minimum of 180 ms, and 260 ms, 280 ms, 340 ms, 360 ms, 420 ms, 440 ms and 480 ms ($5*2^n+4*k$ frames) are available for the PMRM report interval. The PSMM and the PSMMM are not periodic. For the periodic PSMM order, the minimum period is 800 ms. In addition, when the PSMM transmission duration of the mobile station is identical to the PMRM transmission duration, the reverse link quality is decreased. Hence, it is preferable to asynchronously transmit data between the mobile stations with the frame level.

An operating position of the leg selection algorithm is defined by the MMCP.

With regard to an operating interval of the leg selection algorithm, leg selection frames for the respective users are not synchronized with one another (Frame Asynchronous). In the embodiment of the present invention, the PMRM interval for the data call is set to 260 ms. Further, the leg selection results are provided to the RRMP through the RMCP.

In this case, there are two types of information necessary for the leg selection from the BTS, for the respective legs, as shown in FIG. 7. As for the first information, the respective BTSs transmit the information about the available power for the SCH to the BSC as shown in FIG. 7. Here, since there is no direct path from the RRMP to the MMCP, the BTS transmits the available power information to the BSC through an in-band path from the RMCP to the MMCP. The second information is the pilot strength information. For the pilot strength information, the MCCP uses the last value obtained by processing the PMRM, PSMM or PSMMM.

Figure 8:
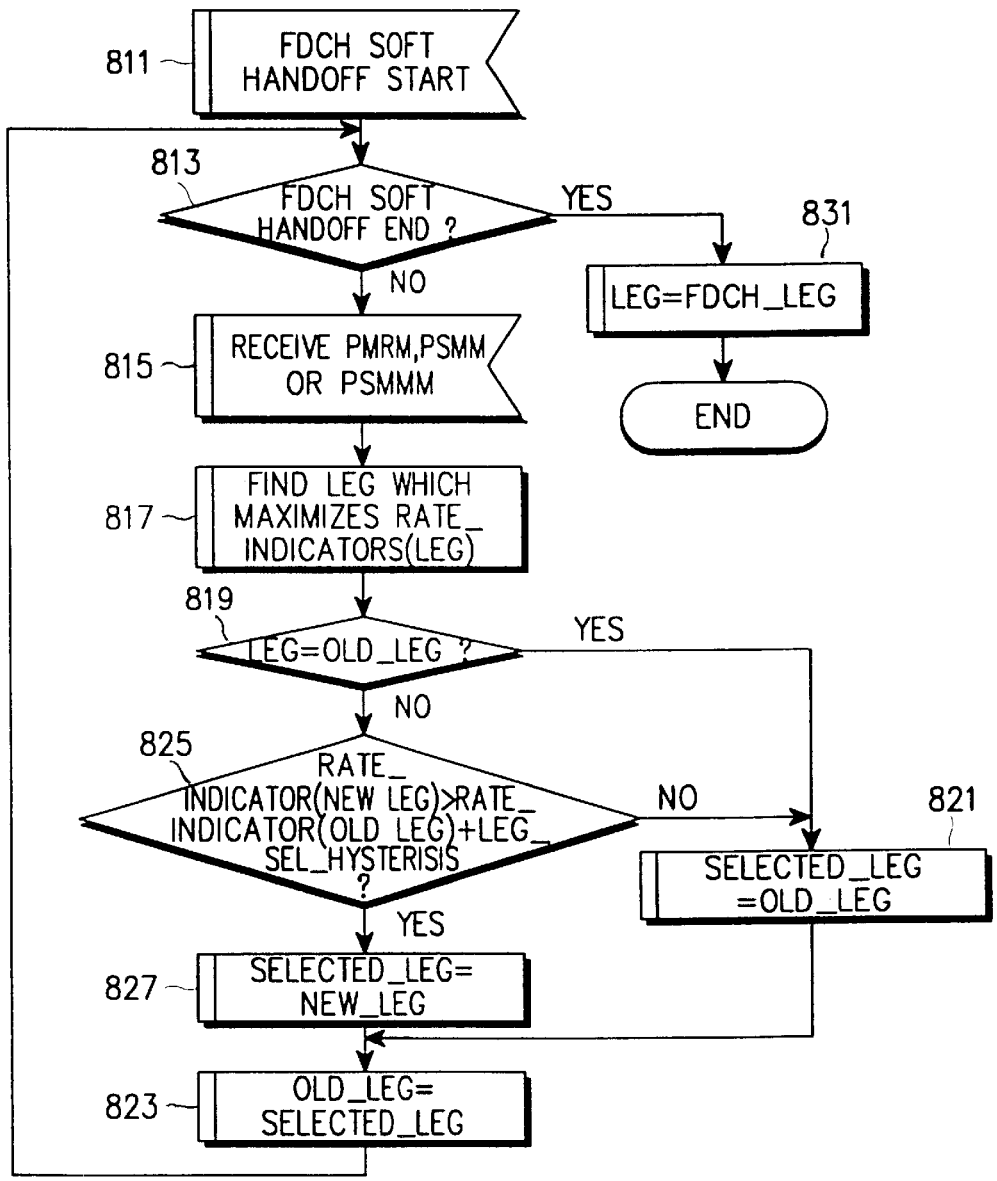
FIG. 8 is a flow chart illustrating a procedure for selecting legs during radio packet data communication in a wireless communication network according to an embodiment of the present invention.
Figure 9:
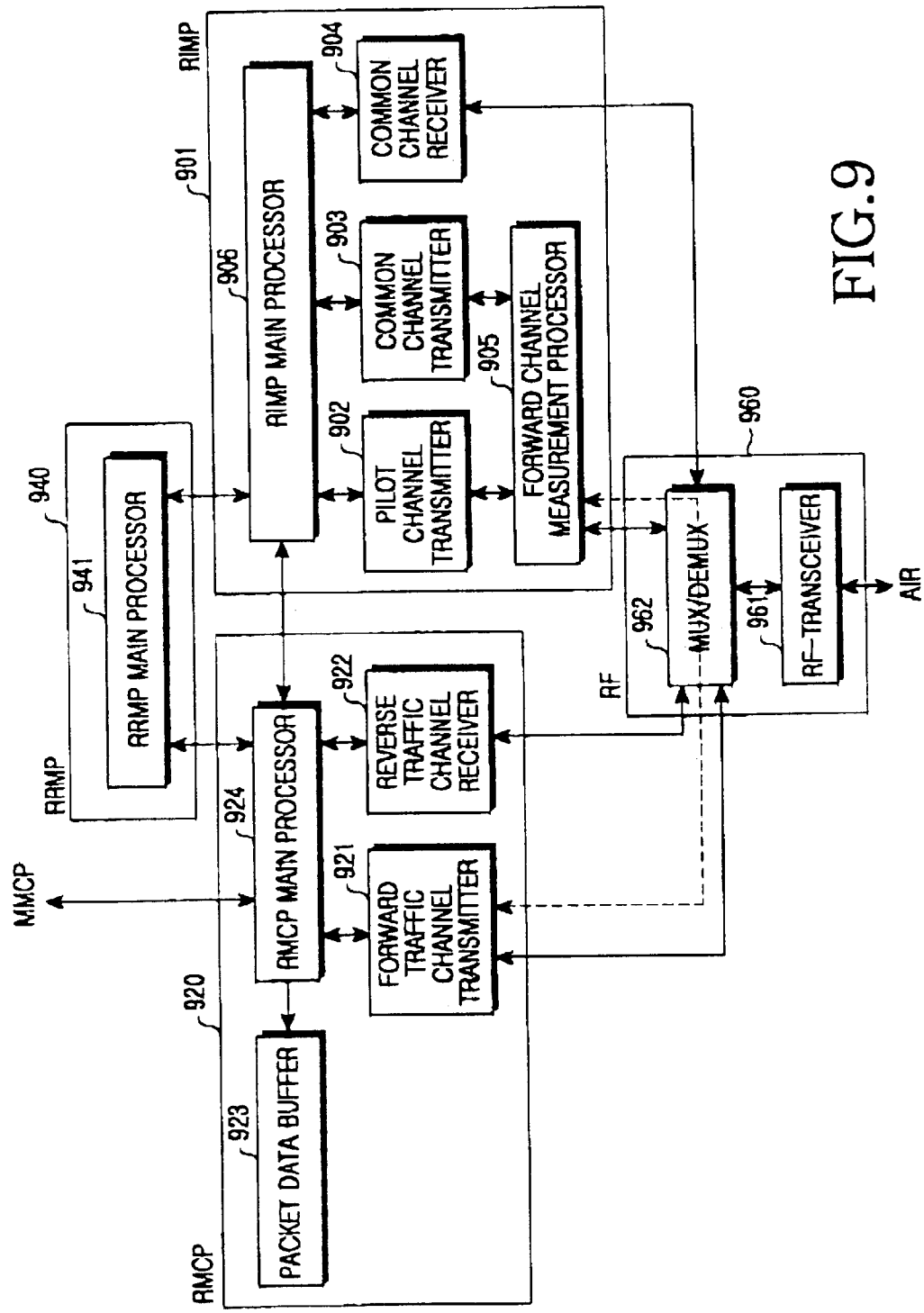
FIG. 9 is a block diagram illustrating the detailed structure of the BTS shown in FIG. 3.

FIG. 8 shows an algorithm for selecting a leg in the BSC using the above information.

Referring to FIG. 8, in step 811, a soft handoff is started for a dedicated channel (FCH/DCCH in the CDMA system; hereinafter referred to as "FDCH") for transmitting control information (FDCH Soft Handoff Start). In step 813, it is determined whether the FDCH soft handoff has ended. If the FDCH soft handoff has ended, the BSC selects the handed-off FDCH leg in step 831.

Otherwise, if the FDCH soft handoff has not ended in step 813, the BSC receives the pilot strength information of PMRM, PSMM or PSMMM in step 815. Thereafter, the BSC finds a leg for maximizing a rate indicator in step 817. Here, the found leg can be either the presently connected old leg or a new leg. After finding the leg, the BSC determines in step 819 whether the found leg is an old leg. If the found leg is the old leg, it means that the present leg has a better condition than the new leg. Thus, the BSC selects the found leg as the old leg in step 821.

However, if the found leg is not the old leg in step 819, the BSC determines in step 825 whether a rate indicator of the new leg is larger than the sum of a rate indicator of the old leg and a hysteresis value (LEG__Sel__Hysteresis) set for the leg selection. That is, in the embodiment of the present invention, the new leg is selected as the old leg, when the rate indicator of the new leg is larger than the rate indicator of the old leg and the set hysteresis value is satisfied. Therefore, when the above condition is not satisfied in step 825, the BSC proceeds to step 821 to select the old leg. Otherwise, when the condition is satisfied, the BSC selects the new leg in step 827.

After selecting the leg in step 821 or 827, the BSC determines the selected leg as the old leg in step 823 and returns to step 813. By doing so, the BSC selects the BTS having the higher data rate out of the two or more BTSs connected to the mobile station in the soft handoff state.

The leg selection algorithm will be described more specifically.

When selecting a leg by activating the leg selection algorithm, the MMCP of the base station controller (BSC) receives pilot strength from the MCCP and available power values for the SCH from the RIMP of each BTS. The MMCP first calculates a data rate serviceable in each leg for the mobile station, and then, selects the BTS supporting the highest data rate out of the data rates calculated for the two or more legs.

A description of the invention will be made with reference to a first embodiment in which available rates (Available SCH Power (LEG)) of each leg are first calculated and then the leg having the highest rate (Rate_achiev) is selected, and a second embodiment in which available rate indicators (Rate_indicator) of each leg are first calculated and then the leg having the highest rate indicator value is selected.

First, a description will be made of the first embodiment for selecting the leg having the highest Rate_achiev after calculating the available rates Rate_achiev of respective legs.

The available rates Rate_achiev in each leg for the user are calculated as follows, on the assumption that the entire available SCH power is used by the user. Here, it will be assumed that the pilot power (Pilot Power (LEG)) is known to the MMCP because the BSC uses one static value for the pilot power.

The available rates Rate_achiev of the respective legs are determined as follows, using the available SCH power of the legs, the pilot power of the legs, pilot Ec/Io provided from the mobile station, and an Eb/Nt value necessary for maintaining the performance.

$$Rate\_achiev\ (LEG)=f(Available\ SCH\ Power\ (LEG)/Pilot\ Power\ (LEG),\ Pilot\ rx\ Ec/Io\ (LEG),\ Req\ Eb/Nt\ table)$$

First, an SCH offset, which is a ratio of the available SCH power to the pilot power, is calculated using the available SCH power and the pilot power.

$$SCH\ offset=(Available\ SCH\ Power)/(Pilot\ Power)$$

In this case, the maximum processing gain (pg), which can be assigned for the available SCH power, is calculated as follows.

$$pg=Req\ Eb/Nt/(Pilot\ Ec/Io*SCH\_offset)$$

where Req Eb/Nt indicates a reception Eb/Nt value at the mobile station, which is previously known through simulation, and Pilot Ec/Io indicates a pilot reception Ec/Io value provide from the mobile station through the signaling messages such as the PMRM or PSMM.

Finally, the available rate is determined as follows, since the processing gain at the rate of 9.6 Kbps is 128.

$$Rate\_achiev=128/pg*9.6\ kbps$$

When there are several legs, the BSC selects the BTS supporting the highest rate out of the available rates Rate_achiev calculated for the respective legs and performs data transmission on the selected leg.

The packet is not scheduled until the selected leg is scheduled in the RRMP, if a reverse SER (Symbol Error Ratio) is higher than a set threshold SER__BAD__THRESH when the reverse FCH is assigned, or if the reverse pilot Ec/Nt is lower than a set threshold RPICH__BAD__THRESH when the reverse DCCH is assigned.

Next, a description will be made of the second embodiment for selecting the leg having the highest Rate_indicator after calculating the available rate indicators Rate_indicator of respective legs. In this embodiment, the rate indictor Rate_indicator can be calculated by $$Rate\_indicator(leg)=Pilot\_Strength\_dB(leg)+Available\_SCH\_Power\_dB(leg)$$

A leg selection algorithm according to the second embodiment of the present invention is given as follows using the Rate_indicator.

In this case, the rate indicators of the respective legs are calculated using the pilot Ec/Io provided from the mobile station and the available SCH power, and then the leg having the highest rate indicator value is selected.

for (each leg in the Active Set)

$$Rate\_indicator(leg)=Pilot\_Strength\_dB(leg)+Available\_SCH\_Power\_dB\ (leg);$$

$$Leg=argmaxleg(Rate\_indicator(leg));$$

That is, the leg having the high reception pilot power at the mobile station and having the high available SCH power is selected for the data service.

Meanwhile, in order to prevent a ping-pong phenomenon in the handoff area, the data service is continuously performed in the existing leg when the rate indicator value of the newly determined leg is smaller than the rate indicator value of the previous leg plus the hysteresis value.

```
if (Leg == Old_Leg) { Selected_Leg= Old_Leg; }
else if (New Leg != Old_Leg) {
        if (Rate_indicator(Leg) > Rate_Indicator(Old_Leg) +
Leg_Sel_Hysteresis)
                Selected_Leg=Leg;
        else
                Selected_Leg= Old_Leg; }
Old_Leg=Selected_Leg
```

The leg selection method according to the second embodiment of the present invention is performed as shown in the process of FIG. 8, and the Rate_indicator is used for the Rate_achiev of the first embodiment. Here, the Rate_indicator is the pilot strength (dB) plus the available SCH power (dB), and the base station controller (BSC) selects the BTS having the highest Rate_indicator value after calculating the rate indicator values Rate_indicator of the base transceiver systems (BTSs) in the handoff state. In the leg selection process, a new leg is selected when the condition of Rate_indicator(Leg)>Rate_indicator(Old_Leg)+Leg_Sel_Hysteresis is satisfied.

In addition, the packet is not scheduled until the selected leg is scheduled in the RRMP, if the reverse SER is higher than a set threshold SER_BAD_THRESH when the reverse FCH is assigned, or if the reverse pilot Ec/Nt is lower than a set threshold RPICH_BAD_THRESH when the reverse DCCH is assigned.

The SCH scheduling and assignment method according to the embodiment of the present invention has the following advantages.

(1) By assigning the SCH according to the embodiment of the present invention, it is possible to efficiently support the limited radio resources. (2) The embodiment of the present invention can assign the radio channel to the mobile stations by the scheduling concept. Therefore, it is possible to maximize utilization efficiency of the radio channels by minimizing the duration where there exists no radio channel resource. (3) The embodiment of the present invention can fairly provide service to a plurality of users through the scheduling concept. (4) The embodiment of the present invention can support the quality of service (QoS) desired by the system operator by applying the PFQ (Pseudo Fair Queuing) algorithm as requested by the system operator.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for assigning packet data to be transmitted to a radio packet data channel of a base station system in response to packet traffic transmission requests for a plurality of mobile stations in a mobile communication system, the method comprising the steps of:

collecting the packet traffic transmission requests of the radio packet data channel, which is exclusively used in a forward link, for the mobile stations;

selecting at least one of the mobile stations from the collected packet traffic transmission requests;

dividing the radio packet data channel in a transmission unit time;

transmitting to each selected mobile station a channel assignment message including information about a data rate, a data transmission duration and a start time of the data transmission durations for the selected mobile station; and transmitting the packet data to the selected mobile station at the start time of the data transmission durations at the data rate in the transmission unit time.

2. The method as claimed in claim 1, wherein the step of selecting the mobile station intended to use the radio packet data channel comprises the step of selecting candidate mobile stations by a PFQ (Pseudo Fair Queuing) algorithm.

3. The method as claimed in claim 2, wherein the step of selecting the mobile station intended to use the radio packet data channel comprises the step of first selecting a mobile station which used the radio packet data channel in a previous data transmission duration, out of the candidate mobile stations.

4. The method as claimed in claim 2, wherein the step of selecting the mobile station intended to use the radio packet data channel comprises the step of first selecting mobile stations having different frame offsets, out of the candidate mobile stations.

5. The method as claimed in claim 1, wherein the step of transmitting the channel assignment messages to the mobile stations intended to use the radio packet data channel comprises the step of dispersedly transmitting the channel assignment messages based on the start points of the data transmission durations.

6. The method as claimed in claim 1, wherein the radio packet data channel is a supplemental channel (SCH).

7. A method for scheduling and assigning a radio packet data channel in a base station system for a mobile communication system, the method comprising the steps of:

collecting, in a first scheduling interval, the packet traffic transmission requests of the radio packet data channel, transmitted from mobile stations;

selecting, in a second scheduling interval, at least one mobile station intended to use the radio packet data channel by scheduling the packet traffic transmission requests, determining a data rate, a data transmission duration and a start time to be used by the selected mobile station, and generating a channel assignment message for the radio packet data channel, the channel assignment message including information about the determined data rate, data transmission duration and start time; and transmitting, in a third scheduling interval, packet data for the corresponding mobile station at a start point of the corresponding data transmission duration of the respective mobile stations to which the radio packet data channel is sequentially assigned, ending transmission of the radio packet data at an end point of the last assigned data transmission duration of the mobile station, and transmitting the packet data to the last mobile station assigned.

8. The method as claimed in claim 7, wherein the scheduling interval includes at least two data transmission durations.

9. The method as claimed in claim 8, wherein the data transmission duration is N (N=1,2,3, . . . ) times a frame size of the radio packet data channel.

10. The method as claimed in claim 9, wherein the radio packet data channel includes 20 ms frames.

11. The method as claimed in claim 7, wherein the scheduling interval includes a guard interval for preventing frame offset collision of the mobile station which is assigned at least two data transmission durations and the radio packet data channel.

12. The method as claimed in claim 7, wherein the step of transmitting the channel assignment messages to the mobile stations intended to use the radio packet data channel comprises the step of dispersedly transmitting the channel assignment messages based on the start points of the data transmission duration.

13. An apparatus for assigning packet data to be transmitted to a radio packet data channel of a base station system in response to a packet traffic transmission request for a plurality of mobile stations in a mobile communication system, the apparatus comprising:

a collector for collecting the packet traffic transmission requests of the radio packet data channel for the mobile stations;

a scheduler for selecting at least one of the mobile stations from the collected packet traffic transmission requests;

a message generator for generating a channel assignment message including information about a data rate, a data transmission duration and a start time of the radio packet data channel and start points of the data transmission durations for the selected mobile station, and transmitting the generated channel assignment message to the selected mobile station; and a transmission device for transmitting the packet data to the selected mobile station at the start points of the data transmission durations at the data rate.

* * * * *